Jan. 12, 1937. D. L. SMITH 2,067,212
TORCH CONTROL APPARATUS
Filed July 31, 1935 2 Sheets-Sheet 1
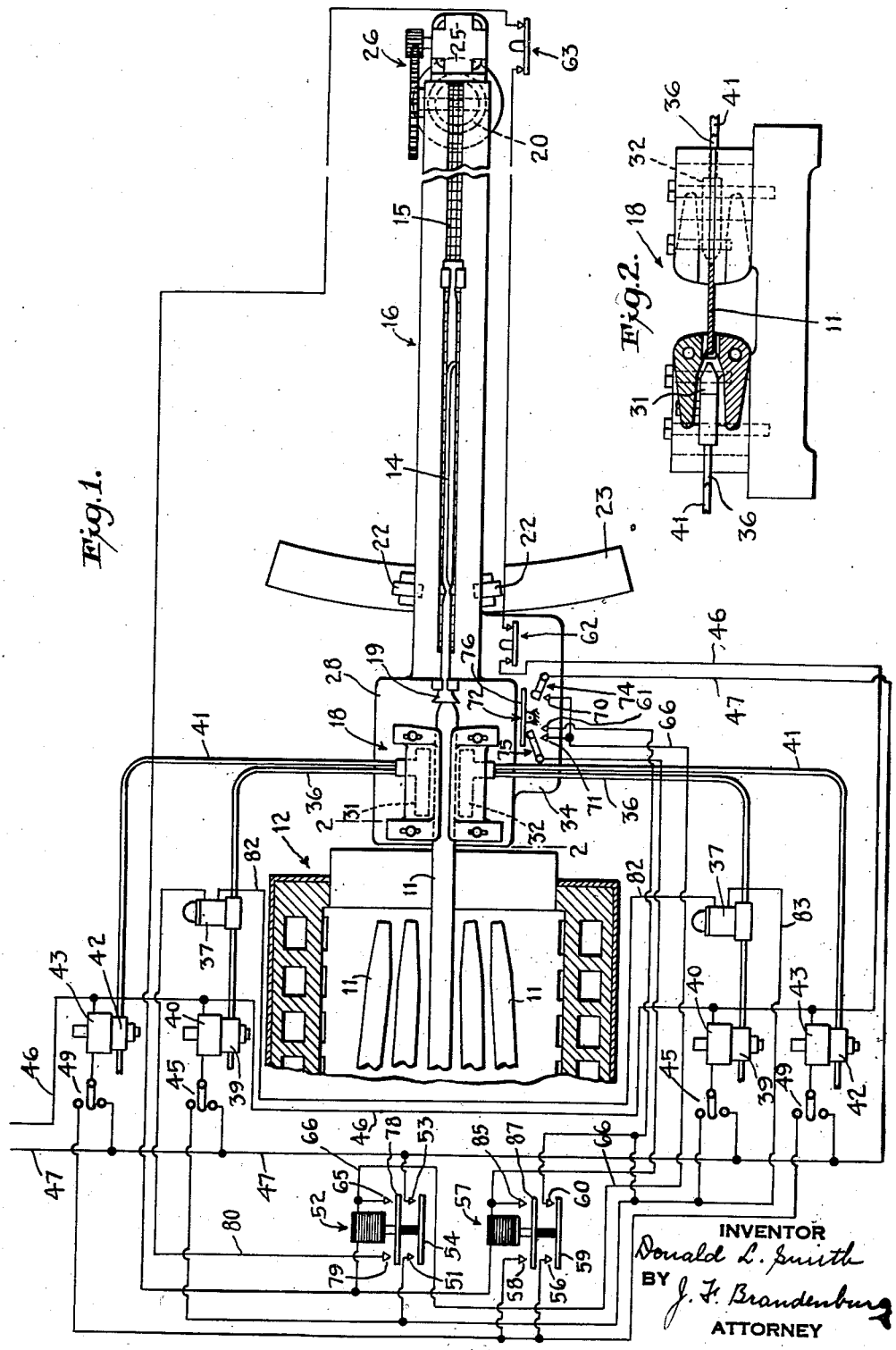

Jan. 12, 1937.   D. L. SMITH   2,067,212
TORCH CONTROL APPARATUS
Filed July 31, 1935   2 Sheets-Sheet 2

INVENTOR
Donald L. Smith
BY
J. F. Brandenburg
ATTORNEY

Patented Jan. 12, 1937

2,067,212

UNITED STATES PATENT OFFICE

2,067,212

TORCH CONTROL APPARATUS

Donald L. Smith, Caldwell, N. J., assignor to Air Reduction Company, Incorporated, New York, N. Y., a corporation of New York Application July 31, 1935, Serial No. 33,959

18 Claims. (Cl. 205—9)

This invention relates to apparatus for controlling the gas supply to the torches of skelp-heating retorts used in the manufacture of welded pipe or tubin.

Among the recent developments in the pipe making art is the manufacture of welded pipe or tubing by passing the edges of flat or partially formed skelp through retorts in which torches direct high-temperature flames against the skelp edges, and then forming and welding the tube by means of a die or rollers located beyond the retort. The oxy-fuel gas flames of the torches in the retorts are hot enough to melt the skelp edges away quickly, if these edges did not move through the retort with continuous motion and at high speed. The amount of heat put into the edges can be controlled to raise the edges to a suitable temperature for making a pressure weld, or to actually produce sufficient melting of the edge faces to make a fusion weld when the faces are brought together in the closing die or rollers.

The skelp is usually preheated in a furnace before passing through the retort which heats the edges, but the preheating can be obtained in other ways, or the entire heating of the skelp can be done in the retort. There are distinct advantages in both economy and operation, however, in preheating the skelp in a furnace.

Various means for moving the skelp through the retort can be employed, but the skelp is usually pulled through the retort by a draw-bench, and the forming and welding done in a bell die held in the head-block of the draw-bench.

It is an object of this invention to control the operation of the retort torches more advantageously than heretofore, and another object is to combine improved control means with retort and draw-bench apparatus for making welded pipe or tubing.

Another object of the invention is to shut off all gas from both retort torches in the event of a flash-back in either of the torches, the term "flash-back" being used in this specification in a broad sense to include situations in which the flame flashes into the burner or torch tip and then ceases to burn, leaving the torch extinguished, or continues to burn within the torch, but without traveling back through a gas conduit, and to include back-fires in which the flame does travel back through a gas delivery conduit.

It is particularly advantageous to cut off the gas from both torches in case of a flash-back in one torch of a retort which heats the edges of very narrow skelp because in such retorts the torches are close together and the heat from a burning torch will damage an opposing extinguished torch during the time when there is no skelp between the torches.

Other objects, features and advantages of the invention will appear or be pointed out as the specification proceeds.

In the accompanying drawings, forming part hereof:

Fig. 1 is a diagrammatic plan view showing a draw-bench and one end of a skelp-heating furnace with a retort between the furnace and draw-bench, and with means for controlling the gas supply to the retort in accordance with this invention;

Fig. 2 is an enlarged view, partly in section, on the line 2—2 of Fig. 1;

Figure 3:
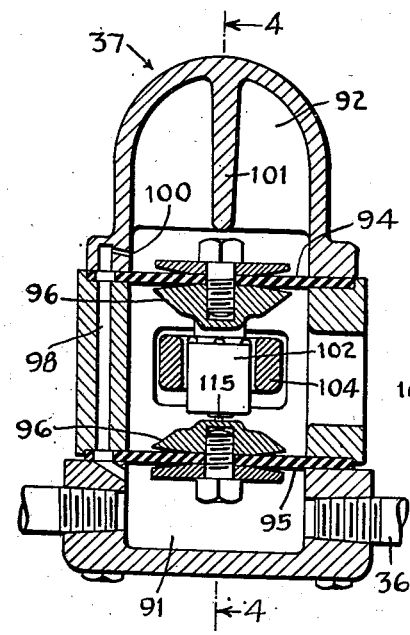
Fig. 3 is an enlarged sectional view of a pressure operated switch of the torch control means, the section being taken on the line 3—3 of Fig. 4.
Figure 4:
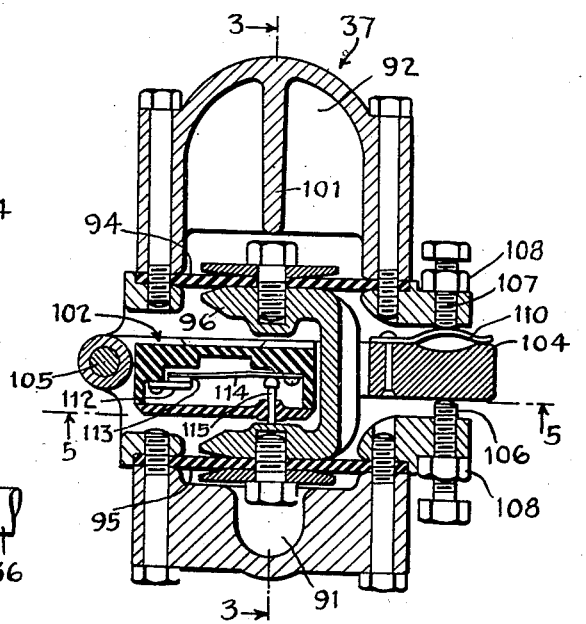
Figure 6:
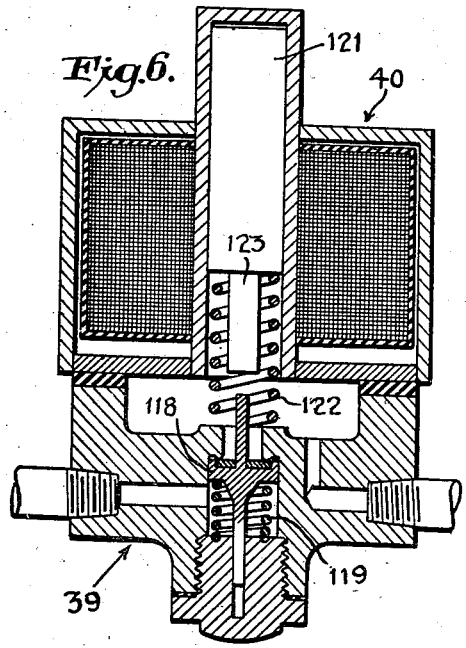
Figure 5:
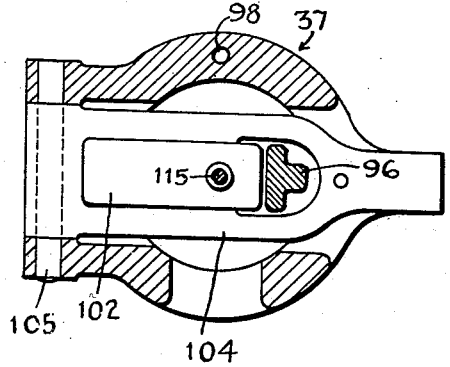

Figs. 4 and 5 are sectional views on the lines 4—4 and 5—5 of Figs. 3 and 4, respectively; and Fig. 6 is an enlarged sectional view of one of the solenoid-operated valves of the torch control means of Fig. 1.

Strips of skelp 11 are successively placed in a furnace 12. An attendant, commonly referred to as the "welder", stands near the exit of the furnace, and as each skelp becomes heated to a degree somewhat below the welding state and below the temperature at which the strength of the metal becomes seriously impaired the welder reaches into the furnace with a tongs 14, grips the end of the skelp, and hooks the handle of the tongs to the chain 15 of a draw-bench 16. The skelp is drawn through a retort 18, which heats the edge faces of the skelp, and through a bell die 19 which bends the skelp into a tube and brings the edges together to make a weld.

The draw-bench is supported on a pivot 20 at one end and on rollers 22 at the other end. The rollers 22 move along a track 23 and permit angular movement of the draw-bench to align it with the strip of skelp which is to be pulled from the furnace. The chain 15 runs over sprockets at both ends of the bench. The sprocket at the end remote from the furnace is driven by a motor 25 through reduction gearing 26. The attendant who operates the draw-bench occupies a position near the motor-end of the draw-bench where he can watch the movement of the skelp from the time it leaves the furnace until the entire length of the skelp has been drawn through the bell.

The retort 18 is supported on a platform 28 connected to or forming a part of the end casting of the draw-bench. The retort includes guides through which the edges of the skelp travel in close proximity to heating burners or torches 31 and 32. These torches are preferably oxyacetylene torches, and each one directs an elongated system of flame against one of the edge faces of the skelp. The burners from which the gases issue may be made an integral part of the retort if desired.

The oxygen and fuel gas supply to the torches can be turned on and off by means of electric switches located on a support 34 extending from the draw-bench within convenient reach of the welder when he is standing at his station near the exit end of the furnace. The welder does not see what happens to the skelp after it passes beyond the retort, and may not be immediately aware of the accident if the tongs pull off the end of the pipe, or the metal breaks as a result of being overheated in the furnace. Such accidents cause the skelp in the retort to stop, and unless the torches are quickly extinguished the skelp in the retort melts along its edges and part of it flows into the air passages and lower parts of the retort, necessitating considerable loss of time in opening and cleaning the retort. The draw-bench operator can watch the pipe during the entire welding operation, and by means of an emergency switch can cut off the gas supply to the torches immediately in case of accident.

Acetylene or other fuel gas is supplied to the torches 31 and 32 through conduits 36. Each of these conduits communicates with a safety device 37 which includes an electric switch and means for operating the switch, in the event of a sudden rise in the gas pressure, to effect a shutting off of the gas supply to the torch. A flashback always causes at least a momentary pressure rise in the conduit. The construction of the safety device 37 will be described in the explanation of Figs. 3–5.

A valve 39 in series with each of the conduits 36 controls the supply of acetylene to the torches. Each of the valves 39 is operated by a solenoid 40 which holds the valve open only so long as the solenoid is excited. Oxygen is supplied to the torches through conduits 41 and valves 42 operated by solenoids 43 similar to those associated with the acetylene lines.

Each of the solenoids 40 is connected with a single-pole, double-throw switch 45 and with a return power line 46. When either of the switches 45 is closed against its lower contact it connects its associated solenoid 40 with a power line 47. Each of the solenoids 43 is similarly connected on one side with the return power line 46 and on the other side with a single-pole, double-throw switch 49 which can be closed against its lower contact to connect the solenoid with the power line 47.

When the switches 45 are closed against their upper contacts they close circuits between the solenoids 40 and a contact 51 of a relay 52. The power line 47 connects with a contact 53 of the relay 52, and when this relay is energized a contact bar 54 closes the circuit between the contacts 51 and 53 so that power is supplied to the solenoids 40.

The upper contacts of the switches 49 connect with contacts 56 and 58 of a relay 57. When this relay 57 is energized it causes a contact bar 59 to close a circuit between the contact 56 and a contact 60 which connects with a switch contact 61 and with the contact 51 of relay 52.

The magnets of the relays 52 and 57 are connected with the line 46 through a normally-closed switch 62 on the support 34 of the draw-bench and a normally-closed emergency switch 63 located within convenient reach of the drawbench operator.

The other side of the magnet of relay 52 is connected with a relay contact 65 and with a conductor 66. This conductor 66 connects with contacts 70 and 71 of a starting control 72 located on the support 34 of the draw-bench within convenient reach of the welder.

The starting control 72 includes two normally open, single-throw switches 74 and 75 which can be closed successively by a plate 76. This plate covers the switches 74 and 75 and is pivotally supported at its center so that it can be rocked to the right or left to close either of the switches 74 and 75.

When the switch 74 is closed, it completes a circuit from the power line 47, through the contact 70, and conductor 66 to the relay 52 and causes the relay to be energized so that it draws a contact bar 78 against the contact 65 and a contact 79. A conductor 80 connects the contact 79 with one side of the switch in the safety device 37 which is operated by gas flowing to the torch 31. The other side of the switch in this safety device 37 is connected by a conductor 82 with one side of the switch in the safety device 37 which is associated with the conduit 36 supplying fuel gas to the torch 32. The other side of this switch connects with the power line 47 through a conductor 83, contact 51, contact bar 54, and contact 53.

Since both of the safety devices 37 are in series, it will be apparent that the opening of the switch in either of them breaks the circuit from the power line 47 through contacts 53 and 51, conductors 83 and 82 to the contact 79. It is this circuit through the safety devices 37 which keeps the magnet of relay 52 energized after this relay has been initially closed by operating switch 74.

The magnet of relay 57 is connected with a contact 85 of the relay and with the switch 75. When the switch 75 is closed, the magnet of relay 57 receives power from the contact 51 of relay 52, if that relay is closed so that contact 51 is connected with the power line 47. If the relay 52 is open at the time the switch 75 is closed, then the closing of this switch has no effect. This circuit construction makes it necessary to close the switch 74 and energize the relay 52 which causes the acetylene valves to open, before the switch 75 can be operated effectively to energize the relay 57 and cause the oxygen valves to open.

The rocking plate 72 makes it impossible to close both of the switches 74 and 75 simultaneously. Each of these switches is normally open, and when closed by the plate 72 springs open as soon as the welder permits the plate to move back into its level position. When the relay 57 is energized, it draws a contact bar 87 against the contacts 58 and 85 and closes a circuit parallel to the switch 75 to maintain the circuit of the relay complete after the switch 75 opens. This circuit may be traced from the power line 47 through contact 53, bar 54, contacts 51 and 60, bar 59, contacts 56 and 58, bar 87, and contact 85 to the magnet of relay 57.

Closing of the switch 75 also completes a circuit parallel to that through the safety devices 37 for keeping the relay 52 energized when the switch 75 is closed. Such a circuit prevents the relay 52 from opening in the event that the first rush of oxygen gas, which accompanies the operation of the switch 75, causes a switch in the safety devices 37 to open.

Although the pressure rise caused in the acetylene lines by opening of the oxygen valves is not large, this parallel circuit closed by the switch 75 makes practical the use of more sensitive safety devices 37. The circuit extends from the power line 47 through contact 53, bar 54, contact 51, switch 75, and conductor 66 to the magnet of relay 52.

Figs. 3-5 illustrate the construction of one of the safety devices 37, the other being of similar construction. A safety device 37 includes a conduit pressure chamber 91 and a counterbalancing pressure chamber 92. The chamber 91 forms a part of the conduit through which the fuel is delivered to the torch. A diaphragm 95 forms the top wall of the conduit pressure chamber 91. A similar diaphragm 94 forms the bottom wall of the counterbalancing pressure chamber 92. The diaphragms 94 and 95 have their center portions clamped to a connector 96 so that any movement of either diaphragm is transmitted to the other.

The chambers 91 and 92 communicate through a conduit 98, which has a restricted portion 100 for causing a time lag between a pressure change in the chamber 91 and a corresponding pressure change in the counterbalancing pressure chamber. The length of this time lag depends on the size of the restricted portion 100 of the conduit 98 and on the capacity of the counterbalancing pressure chamber 92. An abutment 101 limits the upward movement of the diaphragms in case of a very sudden excessive pressure rise in the conduit chamber 91.

An electric switch 102 is supported between the diaphragms 94 and 95 by an arm 104, which is best shown in Figs. 4 and 5. The arm 104 is supported at one end by a shaft 105, which extends through the end of this arm and through the casing of the safety device 37. The arm 104 has a limited pivot movement about the axis of the shaft 105. The other end of the arm 104 extends between opposing limit screws 106 and 107, which thread through portions of the safety device 37 and are held in position by lock nuts 108.

The free end of the arm 104 rests on the lower limit screw 106, and a leaf spring 110, which is fastened to the arm, is confined between the arm and the upper limit screw 107. The arm 104 does not move during the ordinary operation of the safety device, but the spring will yield and permit the switch and diaphragm to rise if the upward pressure of the diaphragm 95 becomes so great that it is likely to damage the switch. The screw 106 is adjusted to bring the switch 102 into proper relation with the diaphragm 95 and connector 96. The screw 107 is adjusted to obtain sufficient tension in the spring 110 to insure operation of the switch 92 before the spring yields.

The switch 102 is shown in Fig. 4 as a simple form of spring-operated switch with a fixed contact 112 connected to the switch housing, which is of insulating material. A movable contact 113 is carried at one end of a leaf spring 114 and the other end of this leaf spring is secured to the switch housing. The tension of the spring 114 normally holds the contact 113 against the contact 112. A push rod 115 extends through the switch housing and contacts with the spring 114 close to its fixed end so that a small movement of the push rod 115 causes a much larger movement at the contact end of the spring and moves the contacts apart to open the circuit. In order that the switch may be longer wearing, a snap-action switch may be employed. The current which passes through the switch is small, however, since it is a relay operating current and not that supplied to the valve-operating solenoids.

The valves 39 and 42 are of similar contruction and so are their solenoid operating means. Fig. 6 shows the construction of one valve 39 and its solenoid 40.

The valve 39 contains a valve element 118 which is urged into closed position by a spring 119. The valve closes in the direction of the gas flow, and the upstream pressure of the gas is effective to hold the valve closed.

The solenoid 40 operates a plunger 121. When the solenoid is not energized, the plunger 121 is held in an elevated position by a spring 122. A stem 123 extends downward from the plunger 121 to within a short distance of the stem of the valve element 118. When the solenoid 40 is energized, it draws the plunger 121 downward against the force of the spring 122 and causes the stem 123 to move into contact with the stem of the valve element 118 and displace the stem so that the valve is moved into open position.

The force required to open the valve is greater than the force required to hold it open because the gas pressure below the valve element 118 resists opening of the valve, but this pressure is largely counterbalanced by the gas pressure of the other side of the valve element after it is moved into open position and gas is flowing around it. The initial gap between the stem of the valve element 118 and the lower end of the stem 123 permits the plunger 121 to start moving and gain considerable momentum before it encounters the resistance offered by the valve element. The plunger stem 123 strikes a hammer blow against the stem of the valve element 118 to impart the initial movement to the valve element. This feature of the valve operating means makes possible the use of a smaller solenoid than would be required if there were no lost motion between the plunger and valve element. The force exerted by the solenoid is greater if the stem 123 is made of non-magnetic material.

The operation of the invention is as follows:

The plate 76 is first rocked to the right in Fig. 1 to close the switch 74 and energize the relay 52. Closing of the relay 52 supplies power to both of the solenoids 40 if the switches 45 are closed against their upper contacts. These switches 45 are always closed against their upper contacts except when the solenoids are to be operated independently of the control circuits. When power is supplied to the solenoids 40, they operate to open the valves 39 so that acetylene can flow through the conduits 36 to the torches 31 and 32.

If the first rush of acetylene gas causes a sudden pressure change in the safety devices 37 sufficient to open the switches in these safety devices, the power to the solenoids 40 is not interrupted because the welder has the switch 74 closed at the time the first rush of gas reaches the safety devices, and the circuit completed by the switch 74 cannot be broken by the safety devices.

The torches are lighted, and the plate 76 is then rocked to the left to close the switch 75 and energize the relay 57. The relay 57 closes and supplies power to the solenoids 43, causing them to open the valves 42 so that oxygen flows through the conduits 41 to the torches 31 and 32.

The skelps 11 are drawn successively from the furnace 12 and pulled through the retort 18 and bell 19 by means of the draw-bench 16. In case of any accident which causes the skelp to stop in the retort, or if for any other reason it becomes desirable to extinguish the torches in the retort, the welder can do so by opening the push-button switch 62, or the draw-bench operator, who is in a better position to see any accident, can extinguish the torches by opening the emergency switch 63.

Either of the acetylene valves 39 can be opened at any time regardless of the control means by closing the switch 45 of the associated solenoid against its lower contact. The switches 49 may be similarly operated to open the oxygen valves 42. This operation of the valves independently of the control mechanism is advantageous for test purposes.

Changes and modifications may be made in the apparatus illustrated and some features of the invention can be used alone without departing from the invention as defined in the claims.

I claim:

1. The combination of a retort having torches, one for heating each of the edge faces of skelp as it moves through the retort with continuous motion, conduits for supplying gas to both torches including separate conduits for oxygen and fuel gas, valve means in said conduits, and automatic control means responsive to a flash-back in either torch for causing the valve means to shut off the supply of gas through at least one of the conduits to both torches.

2. Skelp-heating apparatus comprising a retort, separate burners in the retort in position to direct flame jets against each of the edge faces of skelp as it travels through the retort, conduits for supplying oxygen to the burners, other conduits for supplying fuel gas to the burners, valve means for closing said conduits, and control means operated by a flash-back in either burner for closing the valve means and shutting off both the oxygen and fuel gas supply to both burners.

3. The combination of a retort having means for directing gas jets against the edges of skelp to heat said edges in the manufacture of welded pipe or tubing, and conduits for supplying gas to the burners, of valve means for shutting off the supply of gas, and means for causing said valve means to close, including a safety device operated by a sudden change of pressure in one of said conduits.

4. Apparatus for heating the edges of skelp in the manufacture of welded pipe and tubing, said apparatus including a retort through which the edges of the skelp travel with continuous motion, means in the retort for directing gas jets against both edges of the skelp to heat said edges, conduits for supplying gas to the heating means in said retort, valve means for shutting off all gas from said conduits, and a safety device for controlling the closing of the valve means, said safety device including a diaphragm exposed to the gas pressure in the conduit, a balancing pressure chamber, a restricted conduit through which the balancing pressure chamber communicates with the conduit, and means operated by displacement of the diaphragm when the pressure in the conduit is substantially different from the pressure in the chamber for causing the valve means to close.

5. The combination with a retort having two torches, one in position to heat each edge face of a skelp as it is drawn through the retort, of manual control means operable to supply gas to both torches at the same time, and automatic control means responsive to a flash-back in either torch for shutting off gas from both of said torches.

6. The combination with a retort having two torches, one in position to heat each edge face of a skelp as it is drawn through the retort, of conduits for supplying oxygen to the torches, other conduits for supplying fuel gas to the torches, separate valve means for the oxygen and fuel gas conduits, manually operated control apparatus for the valve means including elements requiring operation of the valve means to supply fuel gas to the torches before said valve means are operated to start the flow of oxygen to the torches, and automatic control means operated by a sudden change in pressure in one of said conduits for closing the valve means to shut off the supply of gas through all of the conduits to said torches.

7. Apparatus for the manufacture of welded pipe and tubing including in combination, a retort with torches for heating the edge faces of the skelp, mechanism for causing the skelp to move through the retort and through closing apparatus which brings the skelp edges together to make a welded tube, automatic control means for shutting off the supply of gas to the torches in case of a flash-back, and auxiliary control means for the gas supply including an emergency shut-off device in position to be actuated by the person operating the mechanism that causes the skelp to move through the retort and closing apparatus.

8. The combination with tube making apparatus including a skelp heating furnace, a bell die for forming the skelp into a tube and bringing the skelp edges together to make a weld, a retort between the furnace and bell with torches for heating the edges of the skelp as it passes from the furnace to the bell, and a draw-bench for pulling the skelp from the furnace and through the retort and bell, of automatic control means for cutting off the supply of gas to the torches in case of a flash-back, and emergency manual control means for the gas supply in position to be actuated by the draw-bench operator.

9. Apparatus for the manufacture of welded pipe and tubing including a draw-bench, a skelp-heating furnace, a bell die at the furnace end of the draw-bench, a retort between the furnace and bell die with torches for heating the edges of the skelp as it passes from the furnace to the bell, apparatus for controlling the supply of oxygen and fuel gas to the torches including manual control means for starting and stopping the flow of gas to the torches, said manual control means being located close to the retort in position to be actuated by the attendant who pulls the skelp from the furnace and connects it with the draw-bench, safety devices for automatically cutting off the supply of gas to the torches in the event of a flash-back, and emergency manual control means for shutting off gas from the torches, said emergency manual control means being located in position to be actuated by the draw-bench operator at the end of the draw-bench remote from the furnace.

10. In apparatus for making welded pipe or tubing, the combination with two torches located in positions to heat the opposite edge faces of the metal before the edges are brought together to make a weld, of separate valves for controlling the supply of gas to the respective torches, and means responsive to a flash-back in either torch for closing the valves and shutting off the supply of gas to both torches.

11. In apparatus for making welded pipe or tubing, the combination with two torches located in positions to heat the opposite edge faces of the metal before the edges are brought together to make a weld, of separate valves for controlling the supply of gas to the respective torches, electromagnetic means for operating each of said valves, and a common switch for supplying power to both of the electromagnetic means to cause the valves to operate simultaneously.

12. Welding apparatus including two torches, separate conduits for supplying gas to said torches, valve means for shutting off the gas from said conduits, and control mechanism for operating the valve means to start or shut off the gas supply to both torches simultaneously.

13. Welding apparatus including two torches, separate conduits for supplying fuel gas to said torches, separate conduits for supplying oxygen to said torches, a valve in each fuel gas conduit, a valve in each oxygen conduit, and common control means for operating both fuel gas valves simultaneously and for operating both of the oxygen valves simultaneously.

14. Welding apparatus including two torches, separate conduits for supplying fuel gas to said torches, separate conduits for supplying oxygen to said torches, a valve in each fuel gas conduit, a valve in each oxygen conduit, and common control means for operating both fuel gas valves simultaneously and for operating both of the oxygen valves simultaneously, said common control means including manually operable means for causing the valves to open or close, and including also automatic means, responsive to a flash-back in either torch, for causing the valves to close in at least one of the conduits to each torch.

15. Welding apparatus including two torches, separate conduits for supplying fuel gas to said torches, separate conduits for supplying oxygen to said torches, a valve in each fuel gas conduit, a valve in each oxygen conduit, and common control means for operating both fuel gas valves simultaneously and for operating both of the oxygen valves simultaneously, said common control means including apparatus preventing opening of the valves in the oxygen conduits ahead of the valves in the fuel gas conduits.

16. Apparatus for controlling the supply of gas to two oxy-fuel gas welding torches including separate valves for shutting off the fuel gas supply from each torch, separate valves for shutting off the supply of oxygen from each torch, common manual control means for operating both of the fuel gas valves simultaneously and for operating both of the oxygen valves simultaneously, and automatic control means, responsive to a flash-back in either torch, for closing all of said valves.

17. Apparatus for controlling the supply of gas to two oxy-fuel gas welding torches including separate valves for shutting off the fuel gas supply from each torch, separate valves for shutting off the supply of oxygen from each torch, common manual control means for operating both of the fuel gas valves simultaneously and for operating both of the oxygen valves simultaneously, said control means including apparatus requiring opening of the fuel gas valves before the oxygen valves can be opened, and safety devices connected with the valve control means and constructed and arranged to cause the valves to close in the event of a flash-back in either torch.

18. The combination with a torch, a conduit for supplying fuel gas to the torch, and another conduit for supplying oxygen to the torch, of valve means in each of said conduits, manually operated control means for opening each of said valve means, apparatus responsive to a sudden change in pressure in one of the gas conduits for causing all open valve means to close, and means for rendering said apparatus ineffective while the manual control means is being operated to open either of said valve means.

DONALD L. SMITH.